US012668520B2

(12) United States Patent
Arbel

(10) Patent No.: US 12,668,520 B2
(45) Date of Patent: Jun. 30, 2026

(54) GLASS BLOWING METHODS, GLASS BLOWING APPARATUSES, AND BLOWN GLASS PRODUCTS

(71) Applicant: Bocci Design and Manufacturing Inc., Vancouver (CA)

(72) Inventor: Omer Arbel, Vancouver (CA)

( * ) Notice: Subject to any disclaimer, the term of this patent is extended or adjusted under 35 U.S.C. 154(b) by 178 days.

(21) Appl. No.: 18/592,410

(22) Filed: Feb. 29, 2024

(65) Prior Publication Data

US 2025/0276929 A1 Sep. 4, 2025

(51) Int. Cl.
 *C03B 9/03* (2006.01)
 *C03B 9/02* (2006.01)
 *C03B 9/36* (2006.01)
(52) U.S. Cl.
 CPC .................. *C03B 9/03* (2013.01); *C03B 9/02* (2013.01); *C03B 9/3663* (2013.01)
(58) Field of Classification Search
 CPC ..................................... C03B 9/02; C03B 9/03
 See application file for complete search history.

(56) References Cited

U.S. PATENT DOCUMENTS

| | | |
|---|---|---|
| 2,289,999 A | 7/1942 | Schutz |
| 4,415,614 A | 11/1983 | von Loewis of Menar |
| 8,348,482 B1 * | 1/2013 | Arbel ...................... F21V 3/061 |
| | | 362/396 |

FOREIGN PATENT DOCUMENTS

| | | | |
|---|---|---|---|
| FR | 2491910 A1 * | 4/1982 | ............... B44F 1/08 |
| WO | WO 2015/049547 | 4/2015 | |

OTHER PUBLICATIONS

British Pathé , Glass Lamps, 1951/2014, <https://www.youtube.com/watch?v=6tuecm9-uLc> (Year: 1951).*
Hanna Hansdotter, Kandidatprogrammet Keramik & Glas, examen 2017/2018, Konstfack—University College, <https://www.youtube.com/watch?v=XPixeoS72-I> (Year: 2017).*
Omer Arbel, 76, 2021, <https://vimeo.com/558285943> (Year: 2021).*
Omer Arbel—84, 2021, <https://vimeo.com/558280076> (Year: 2021).*
Omer Arbel—100, 2021, <https://vimeo.com/622678665> (Year: 2021).*

(Continued)

*Primary Examiner* — Erin Snelting
*Assistant Examiner* — Steven S Lee
(74) *Attorney, Agent, or Firm* — FisherBroyles, LLP

(57) ABSTRACT

Various embodiments of a glass blowing method, glass blowing apparatus, and blown glass product are described having a number of innovative features. In one embodiment, the glass blowing method includes positioning molten glass on the end of a blow pipe, positioning the molten glass in a metal framework, and inflating the molten glass with the blow pipe to expand the molten glass through openings in the metal framework. In another embodiment, the glass blowing apparatus includes a blow pipe and a metal framework structured to be coupled to a head of the blow pipe. In another embodiment, the blown glass product includes bubble chambers having an elongated shape with rounded ends positioned opposite tapered ends where the tapered ends converge at an area on one side of the blown glass product.

20 Claims, 11 Drawing Sheets

(56) References Cited

OTHER PUBLICATIONS

Bush Glass part 1, glass blowing in Africa, arnoutvisser YouTube channel, available at www.youtube.com/watch?v=az50zigZrT0, the video is submitted as one or more pdf files containing screenshots taken at approximately 1 sec intervals, Nov. 11, 2009 (each page in the pdf file is labeled "Bush Glass" and consecutively numbered) (total 291 pp.).

Carbon Craft, Fiberspace Gallery, Oct. 3, 2016 (2 pp.).

Carl Cyrén, Fiberspace Gallery, Jan. 13, 2018 (2 pp.).

Carl Cyrén, masterstudent på Individuell studieplan i Design, Konstfack Vimeo channel, available at vimeo.com/185802938, the video is submitted as one or more pdf files containing screenshots taken at approximately 0.5 sec intervals, 2017 (each page in the pdf file is labeled "CarlCyrén2017" and consecutively numbered) (total 67 pp.).

Dilatometer Series DIL 402 Expedis Classic, Netzsch, Feb. 2022 (16 pp.).

Glass Lamps (1951), British Pathé YouTube channel, available at www.youtube.com/watch?v=6tuecm9-uLc, the video is submitted as one or more pdf files containing screenshots taken at approximately 0.5 sec intervals, 1951 (each page in the pdf file is labeled "GlassLamps" and consecutively numbered) (total 186 pp.).

Hanna Hansdotter, Åke Andrén stiftelsen YouTube channel, available at www.youtube.com/watch?v=yaw3d7IC4NU, the video is submitted as one or more pdf files containing screenshots taken at approximately 0.5 sec intervals, Nov. 20, 2021 (each page in the pdf file is labeled "HannaHansdotter" and consecutively numbered) (total 109 pp.).

Konstfack Degree Exhibition 2016, Konstfack University College of Arts, Crafts and Design, 2016 (3 pp.).

Watch the Hypnotic Work of Hanna Hansdotter as She Makes Her Famed Glass Sculptures, Vogue Scandinavia YouTube channel, available at www.youtube.com/watch?v=klsVqEUji0E, the video is submitted as one or more pdf files containing screenshots taken at approximately 0.5 sec intervals, Feb. 8, 2023 (each page in the pdf file is labeled "Watch" and consecutively numbered) (total 116 pp.).

* cited by examiner

GLASS BLOWING METHODS, GLASS BLOWING APPARATUSES, AND BLOWN GLASS PRODUCTS

TECHNICAL FIELD

This relates to glass blowing methods, glass blowing apparatuses, and blown glass products.

BACKGROUND

Glass blowing is a centuries-old technique used to shape molten glass into various objects or artistic creations. It involves heating glass to a high temperature until it becomes malleable and viscous. The molten glass is then inflated and manipulated using a blow pipe.

Glass blowing is performed by a skilled artisan who positions a gather of molten glass at the end of the blow pipe. The artisan blows air through the blow pipe, which creates pressure inside the gather and causes the glass to expand and take on the desired shape. The glass blower shapes, molds, and manipulates the glass using various tools such as molds, paddles, and jacks to achieve the desired shape.

Glass blowing has applications in various industries, including art, scientific apparatuses, glassware, and decorative objects. It requires a combination of technical skill, artistic flair, and a deep understanding of glass behavior under heat. The resulting glass objects can range from delicate glassware to intricate sculptures, demonstrating the versatility and potential of this ancient craft.

GENERAL DESCRIPTION

The subject matter described in this document and recited in the claims represents a technological improvement in the field of glass blowing. The subject matter of this application is directed to various embodiments of glass blowing methods, glass blowing apparatuses, and blown glass products.

The glass blowing method can be used to create unique and interesting blown glass products by blowing molten glass through openings in a metal framework and removing the molten glass from the exterior of the metal framework to form a blown glass product. The method can use a glass blowing apparatus that includes a blow pipe coupled to the metal framework. The method can be used to form a blown glass product including bubble chambers that have an elongated shape with rounded ends and tapered ends where the tapered ends converge at an area on one side of the blown glass product.

In some embodiments, the metal framework can be reused to form multiple blown glass products. For example, the method can include blowing molten glass through the openings in the metal framework, removing molten glass from the exterior of the metal framework to form a blown glass product, removing residual glass from the metal framework, and reusing the metal framework to form another blown glass product. In this way, the metal framework is not sacrificial and can be reused used many, many times to make a large number of blown glass products.

It should be appreciated that the methods, apparatuses, and products can be related as described above (e.g., the apparatus is used in the method to form the product) or they can be independent and separate from each other (e.g., the method uses a different apparatus to form a different product, etc.). For example, the glass blowing method can be performed with any suitable glass blowing apparatus to produce an equally wide range of blown glass products.

Likewise, the glass blowing apparatus can be used in any glass blowing method to produce a variety of blown glass products. The blown glass products can be formed using any suitable glass blowing method and with any suitable glass blowing apparatus.

In some embodiments, a glass blowing method includes one or more of the following steps: positioning molten glass on a blow pipe: positioning the molten glass on the blow pipe in a metal framework; inflating the molten glass with the blow pipe to expand the molten glass through openings in the metal framework; and removing the molten glass from the exterior of the metal framework to form a blown glass product.

In some embodiments, a glass blowing apparatus includes one or more of the following: a blow pipe including a head and a mouthpiece end, the head being structured to receive and hold molten glass; and a metal framework structured to be coupled to the head of the blow pipe.

In some embodiments, a blown glass product includes bubble chambers each of which has an elongated shape with a rounded end positioned opposite a tapered end; wherein the tapered ends of the bubble chambers converge at an area at one side of the blown glass product.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which.

DETAILED DESCRIPTION OF EMBODIMENTS

The following is a detailed description of various embodiments of a glass blowing apparatus, glass blowing method, and blown glass product (alternatively referred to as a blown glass item, blown glass piece, or blown glass article). It should be appreciated that the details of the apparatus, method, and/or product can vary in a number of ways and should not be confined solely to what is shown and described in the following. The glass blowing apparatus is described first followed by the glass blowing method and the blown glass product.

It should be appreciated that any suitable type of glass can be used with the glass blowing apparatus, glass blowing method, and/or as the blown glass product. In one embodiment, the glass is preferably soda-lime glass because it is more suitable for glass blowing than other types of glass. The glass can also be clear or include various pigments—e.g., iron oxides, manganese oxides, carbon oxides, copper, tin, and the like.

Glass Blowing Apparatus

Figures 1, 2:
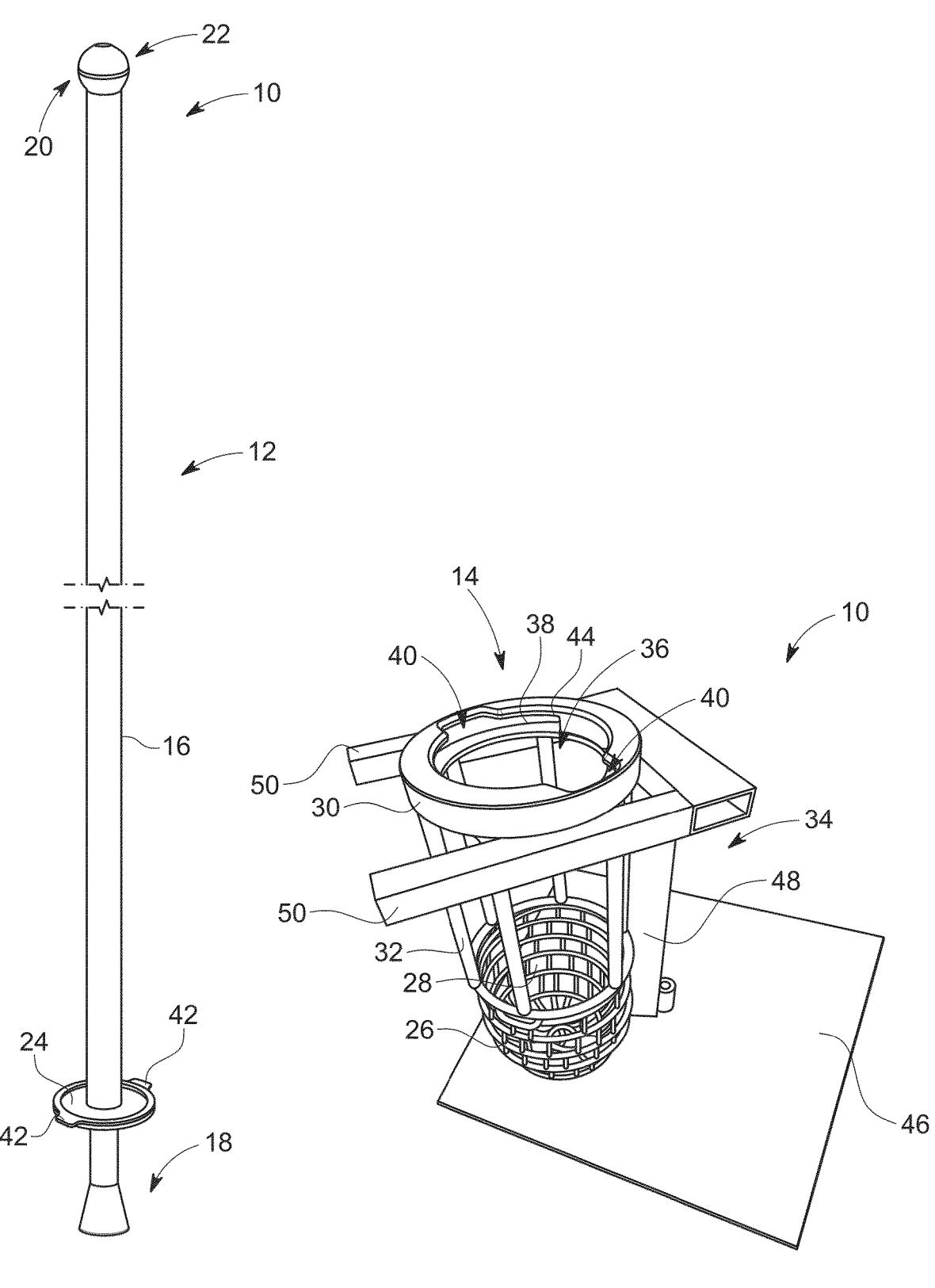
FIG. 1 is a perspective view of one embodiment of a blow pipe that is part of a glass blowing apparatus.
FIG. 2 is a perspective view of one embodiment of a metal framework that is part of the glass blowing apparatus and that can be selectively coupled to and decoupled from the blow pipe in FIG. 1.

FIGS. 1 and 2 show one embodiment of the glass blowing apparatus 10. Referring to FIG. 1, the glass blowing apparatus 10 includes a blow pipe 12 (alternatively referred to as a blow tube, glass blowing pipe, or glass blowing tube) and a metal framework 14 that are structured to be coupled together. The glass blowing apparatus 10 can be used by a glass artisan to form various blown glass products.

Blow Pipe

The blow pipe 12 is a long, hollow metal tube that is used to gather molten glass 11 (FIG. 3) from a furnace and shape it by blowing air into the blow pipe 12 and inflating the molten glass 11 like a balloon. The blow pipe 12 includes a main shaft 16 having an elongated cylindrical shape that extends to a head 18 (alternatively referred to as a working end) of the blow pipe 12 that is structured to receive and hold the molten glass 11. The head 18 can be designed with specific structural features to effectively receive, manipulate, and hold the molten glass 11 during the glass shaping process.

In some embodiments, the head 18 flares outward to better receive and hold the molten glass 11. For example, in some embodiments, the head 18 has a dimension (e.g., diameter, maximum width for non-round shapes), etc.) that is 1.25-5 times the size of the main shaft 16. In other embodiments, the head 18 has a dimension that is at least 1.25 times the size of the main shaft 16 or no more than 5 times the size of the main shaft 16. In other embodiments, the head 18 has the diameter as the main shaft 16.

It should be appreciated that the head 18 of the blow pipe 12 should be smaller than the opening 36 in the metal framework 14 so that the opening 36 can receive the head 18 of the blow pipe 12 with or without a gather of molten glass positioned on the head 18.

The blow pipe 12 also includes a mouthpiece end 20 (alternatively referred to a blowing end) through which the glass blower can introduce air or other gas into the blow pipe

12 and inflate the molten glass 11 to the desired shape. The mouthpiece end 20 is positioned opposite the head 18 and is the interface through which the glass blower blows air into the blow pipe 12. In some embodiments, the mouthpiece end 20 includes a mouthpiece 22 to provide a tight seal and comfortable fit with the glass blower's mouth, enabling control over the air pressure provided to the blow pipe 12.

It should be appreciated that gas can be introduced to the mouthpiece end 20 of the blow pipe 12 in other ways besides literally blowing it from the artisan's mouth. For example, a source of gas (e.g., a compressed air source or the like) can be coupled to the mouthpiece end 20 of the blow pipe 12 to provide the desired gas flow to inflate the molten glass 11. The amount of gas supplied to the blow pipe 12 can be controlled with a valve or other gas flow control equipment.

It should be appreciated that the blow pipe 12 can have any suitable shape or size depending on a number of factors such as the size of blown glass product, the flexibility needed to accommodate the artisan's technique, and the space available in the working environment. For example, in some embodiments, the blow pipe 12 is 2-10 feet long. In other embodiments, the blow pipe 12 is at least 2 feet long and/or no more than 10 feet long. In some embodiments, the blow pipe 12 is 5-7 feet long (or at least 5 feet long and/or no more than 7 feet long).

The blow pipe 12 also includes a blow pipe coupler 24 located near the head 18 of the blow pipe 12. The blow pipe coupler 24 is structured to enable the blow pipe 12 to be coupled to the metal framework 14. The blow pipe coupler 24 can take any of a variety of forms. For example, in some embodiments, the blow pipe coupler 24 is in the form of a ring (alternatively referred to as a ring coupler) with outwardly extending tabs 42 positioned on opposite sides of the ring.

It should be appreciated that the blow pipe 12 can be made of any suitable material capable of resisting the high temperatures encountered in glass blowing. For example, in some embodiments, the blow pipe 12 can be made from materials such as stainless steel, Inconel, or the like. In some embodiments, the blow pipe 12 can be made of a material having a melting point of at least 1300° C. or at least 1400° C.

Metal Framework

The metal framework 14 includes a cage 26 with openings 28 through which the molten glass 11 can be inflated or extruded. The cage 26 is coupled to and spaced apart from a metal framework coupler 30 by support struts 32. The metal framework 14 is supported in a vertical, upright position by a stand 34.

The metal framework 14 is configured to be coupled to the head 18 of the blow pipe 12 in a manner that prevents lengthwise movement of the blow pipe 12 and the metal framework 14 relative to each other. The metal framework 14 is coupled to the blow pipe 12 to provide stability and control during the glass blowing process. In some embodiments, the metal framework 14 and, in particular, the cage 26 is structured to surround the molten glass 11 on the head 18 of the blow pipe 12.

It should be appreciated that the metal framework 14 can be coupled to the head 18 of the blow pipe 12 in any suitable manner. For example, in one embodiment, the metal framework coupler 30 includes a collar that defines an opening 36 sized to receive the head 18 of the blow pipe 12 with the molten glass 11 positioned on it.

The opening 36 is large enough to allow the gather of molten glass 11 on the head 18 of the blow pipe 12 to freely pass through. In some embodiments, the opening 36 has a dimension (e.g., diameter, minimum width for non-round shapes, etc.) that is 1.5-5 times larger than the maximum dimension of the head 18 of the blow pipe 12.

The metal framework coupler 30 defines an interior channel 38 that is partially open along the interior circumference of the collar. The metal framework coupler 30 includes oppositely positioned recesses 40 sized and positioned to receive the corresponding tabs 42 on the blow pipe coupler 24.

Figures 3, 4:
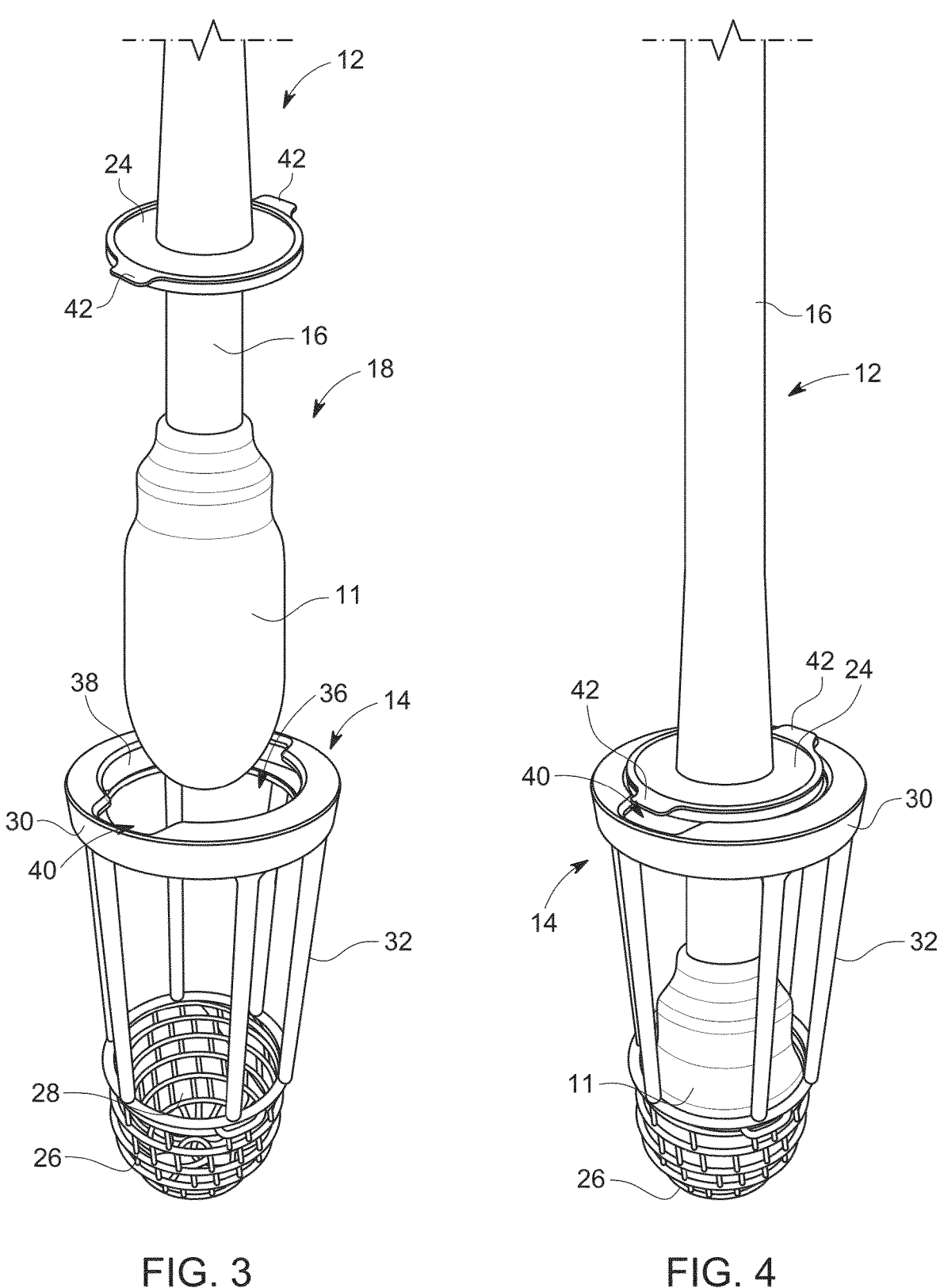
FIGS. 3-5 show one embodiment of a method of coupling the blow pipe with molten glass on the end to a metal framework.
Figure 5:
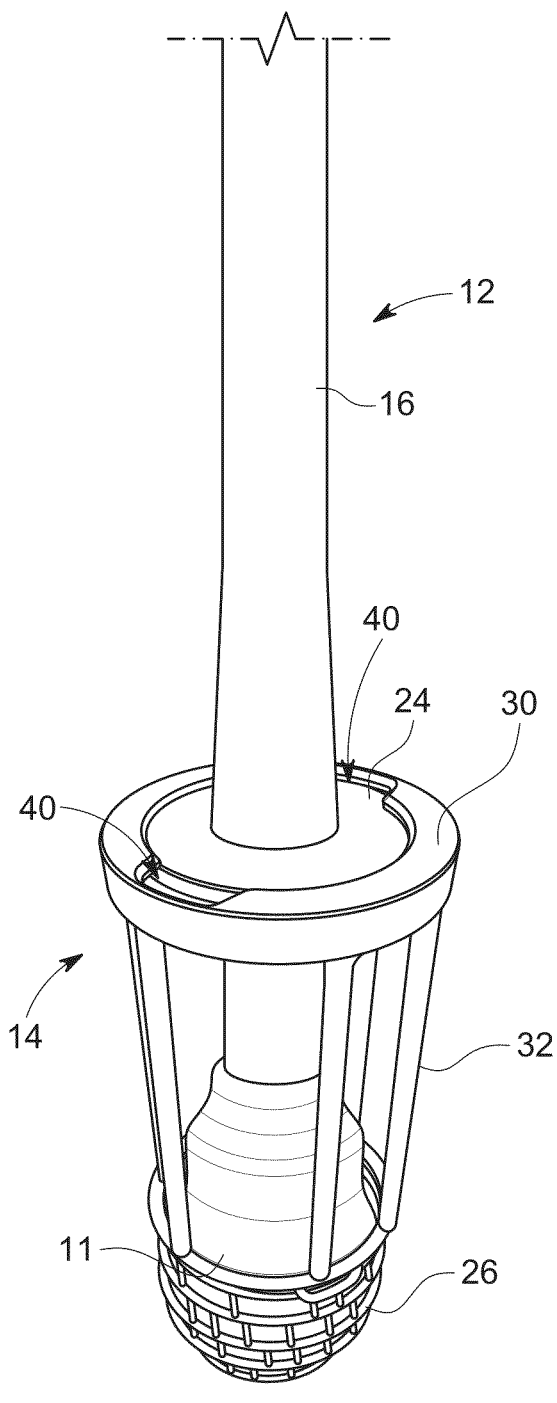

The blow pipe 12 and the metal framework 14 can be coupled together by inserting the head 18 of the blow pipe 12 into the metal framework 14 with the tabs 42 on the blow pipe coupler 24 aligned with the recesses 40 in the metal framework coupler 30 (FIG. 4). Once the tabs 42 have passed through the recesses 40, the blow pipe 12 is rotated to rotate the tabs 42 in the channel 38 until they reach stops 44 (FIG. 5). At this point, the tabs 42 engage the top and bottom walls of the channel 38 to prevent lengthwise movement of the blow pipe 12 and the metal framework 14 relative to each other.

It should be appreciated that the metal framework 14 can be made of any suitable material capable of resisting the high temperatures encountered in glass blowing. This includes any of the materials having any of the properties described above for the blow pipe 12.

The stand 34 includes a base 46, a support leg 48 coupled to the base, and two outwardly extending horizontal support arms 50 coupled to the support leg. The support arms 50 form a U-shape sized to receive and hold the metal framework 14. The stand 34 is especially suitable for holding the metal framework 14 while the blow pipe 12 is coupled to it.

In one embodiment, the support arms 50 are spaced apart to securely receive and hold the metal framework 14. Specifically, the support struts 32 on opposite sides of the metal framework 14 form a square shape that fits snugly between the support arms 50 of the stand 34. However, the collar that forms the metal framework coupler 30 has a diameter that is larger than the square shape formed by the support struts 32. Thus, when the metal framework 14 is on the stand, the support struts 32 prevent rotational movement and the metal framework coupler 30 prevents downward vertical movement. In this way, the metal framework 14 is held securely as the blow pipe 12 is coupled to it.

Glass Blowing Method

FIGS. 3-13 show one embodiment of a glass blowing method. Referring to FIG. 3, a first gather of molten glass 11 is positioned on the head 18 of the blow pipe 12. The blow pipe 12 is aligned with the metal framework 14 in the manner shown. The metal framework 14 is supported by the stand 34 although the stand 34 is not shown for clarity.

The blow pipe 12 with the molten glass 11 on it is inserted into the metal framework 14 in the manner shown in FIG. 4. The molten glass 11 is received by and expands outward to conform to the shape of the interior of the cage 26. Also, the tabs 42 on the blow pipe coupler 25 are aligned with the corresponding recesses 40 in the metal framework coupler 30 in the manner described above. The blow pipe 12 is lowered further into the metal framework 14 and rotated to engage the tabs 42 in the channel 38 of the metal framework coupler 30 and thereby lock the blow pipe 12 to the metal framework 14 as shown in FIG. 5.

Air is blown through the blow pipe 12 into the first gather of molten glass 11 causing it to inflate and thereby fill and protrude through the openings 28 in the cage 26 of the metal framework 14. The inflation process continues until the first gather of molten glass 11 fully expands to occupy the space inside the cage 26 and at least partially extends through the openings 28, which causes the initial formation of bubble chambers 54 in the first gather of molten glass 11. Most if not all the openings 28 produce a corresponding bubble chamber 54 in the first gather of molten glass 11.

It should be appreciated that the openings 28 act as a formative boundary for the formation of the bubble chambers 54 in the molten glass 11 during the blowing process. The openings 28 can be crafted in varying shapes and sizes to accommodate the creative vision of the artist or the requirements of the blown glass product. The number, size, and patterning of the openings 28 can affect the appearance of the blown glass product.

Figures 6, 7:
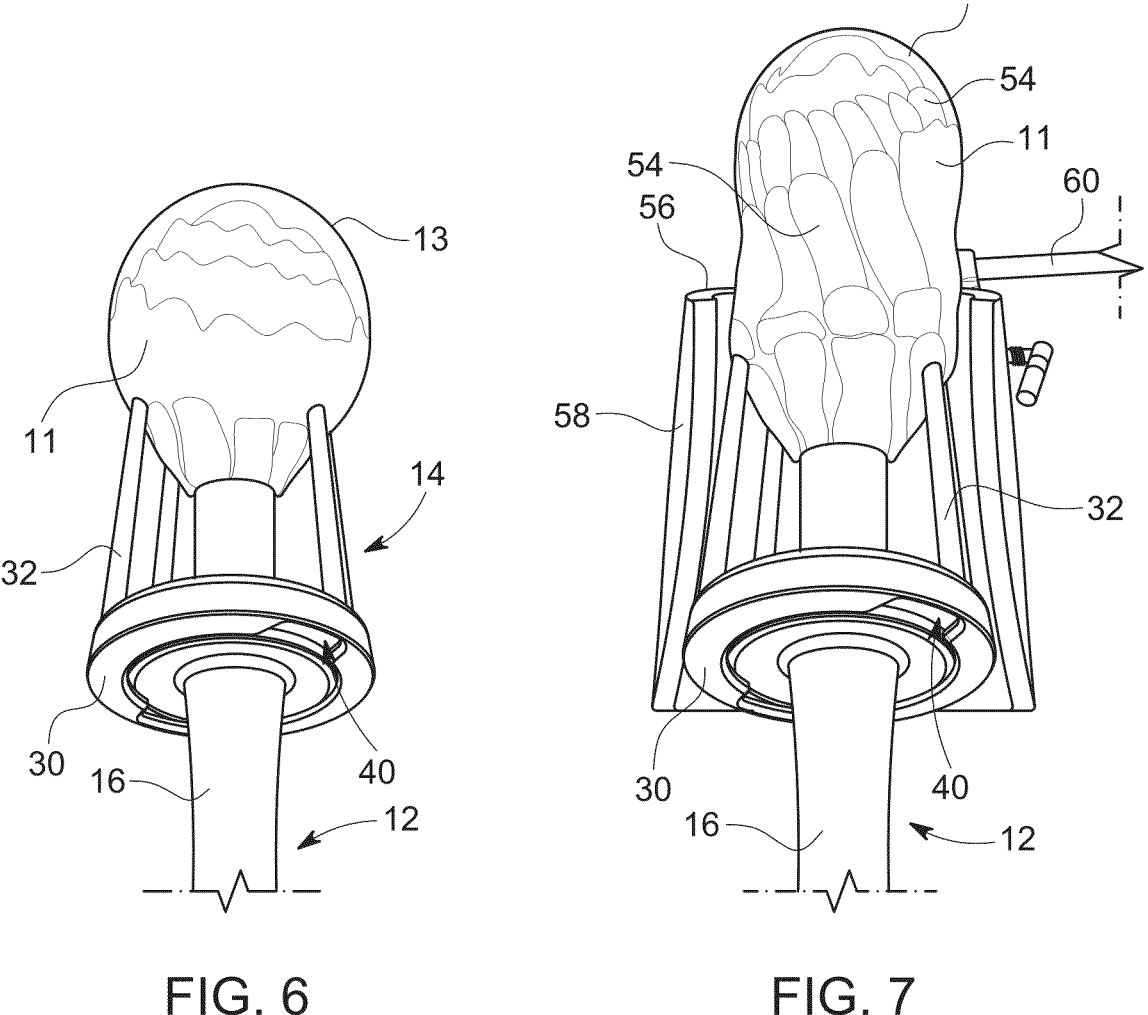
FIG. 6 shows a perspective view of a first gather of molten glass covered by a second gather of molten glass applied to the exterior of the metal framework.
FIGS. 7-8 show perspective views of the process of forcing the gathers of molten glass off the metal framework with U-shaped wooden trough.

Referring to FIG. 6, a second gather of molten glass 13 is positioned on the first gather of molten glass 11 and/or the exterior of the cage 26. The second gather of molten glass 13 fully covers the first gather of molten glass 11 and is formed into an approximately round shape.

It should be appreciated that the addition of the second gather of molten glass 13 is optional and is not required. It should also be appreciated that the second gather of molten glass 13 can only partially cover the first gather of molten glass 11. Also, additional gathers of molten glass can be added to an amalgamation of numerous different glasses.

In some embodiments, the first gather of molten glass 11 and the second gather of molten glass 13 can be different colors to enhance the aesthetic appeal of the final product. For example, in one embodiment, the first gather of molten glass 11 can be an opal white color and the second gather of molten glass 13 can be clear. It should be appreciated that the different glasses can have various other colors as well. Also, in some embodiments, both gathers of molten glass 11, 13 can be translucent to allow light to pass through the glass. This is especially desirable when the blown glass product is used as a light.

In those embodiments that use two or more gathers of molten glass, the different glasses should be compatible with each other. Different glasses are considered compatible with each other if they are capable of being fused together without cracking or breaking during or after the cooling process. The following are some of the factors that determine whether two glasses are compatible: (1) coefficient of thermal expansion (COE), (2) viscosity, (3) glass composition/chemistry, (4) strain point, and/or (5) annealing process.

Glasses with matching or very similar COEs can be fused together because they expand and contract at the same rate when heated and cooled. If glasses with different COEs are used together, the differences in expansion rates can potentially introduce stress into the material as it cools, leading to cracking or breaking.

For two glasses to be considered compatible, their COE values typically need to be within a very close range—e.g., within about 1 or $2 \times 10^{-6}/°$ C. of each other (COE is measured in units of "per degree Celsius" ($\times 10^{-6}/°$ C.)). This range makes it likely that the glasses will expand and contract at roughly the same rate when heated or cooled, thus avoiding the introduction of stress at the interface where the two glasses meet.

The viscosity of glass, or its resistance to flow, can also play a role in determining the compatibility of different glasses. When joining two types of glass, they should have similar viscosities at the working temperature to ensure they can be effectively worked together. The viscosity of the glasses should be similar enough at the working temperature that they can be effectively shaped and fused together. If one glass becomes too fluid while the other remains too rigid, it can make the process difficult and affect the quality of the bond between the glass pieces. In some embodiments, the glasses can have a viscosity when combined or at any point thereafter that is ±10% of the Littleton softening point—i.e., about $\log_{10}(\eta/Pa \cdot s)=6.6$ or $\log_{10}(\eta/Poise)=7.6$. It should be appreciated that it is possible to have matching or similar COE and widely different viscosities and still have compatibility.

The chemical ingredients and impurities in glass can affect its properties, including COE and viscosity. Even if two glasses are nominally designated as having the same COE, the composition can also lead to incompatibilities.

Glass compatibility is especially significant in situations where the first gather of molten glass 11 is extruded through the metal framework 14 and one or more additional gathers of molten glass 13 are added to it. In some embodiments, the glass used for the first and second gathers of molten glass 11, 13 are made by the same manufacturer on the same day to reduce compatibility problems.

The first gather of molten glass 11 is mostly still inside the cage 26 of the metal framework 14. The molten glass 11, 13 is heated until the first gather of molten glass 11 is hot enough to be successfully inflated through the openings 28 in the cage 26. In some embodiments, this can include heating the first gather of molten glass 11 until it is white hot.

Figure 8:
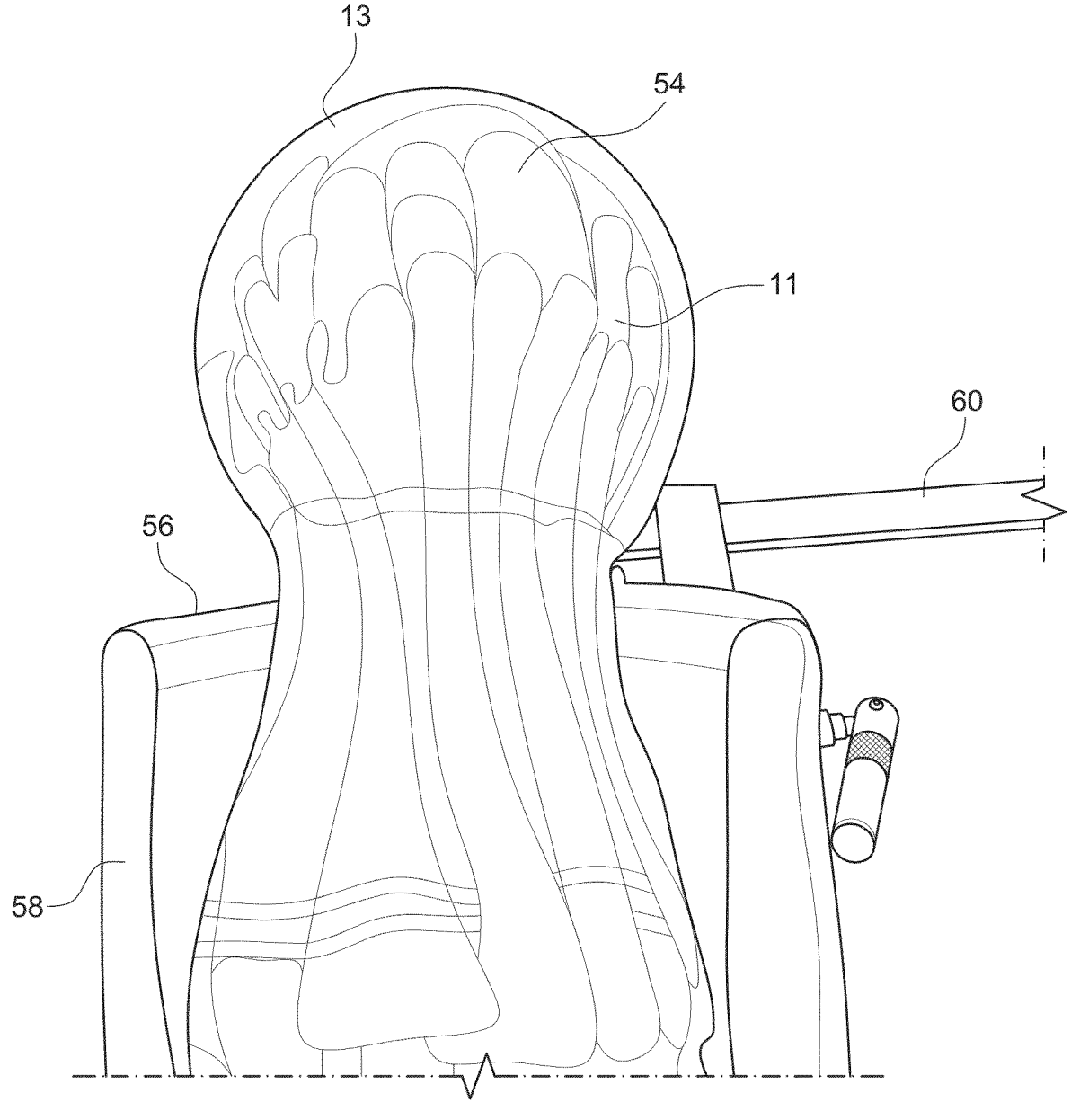

Referring to FIGS. 7 and 8, the molten glass 11, 13 is forced off the cage 26 with the leading edge 56 of a U-shaped, wooden trough 58. This is done by positioning the molten glass 11, 13 on the leading edge 56 of the trough 58 and pulling the blow pipe 12 backward. This also causes the bubble chambers 54 to form tapered ends that are constricted together. Jacks 60 can be used to further separate the molten glass 11, 13 from the metal framework 14.

Figure 9:
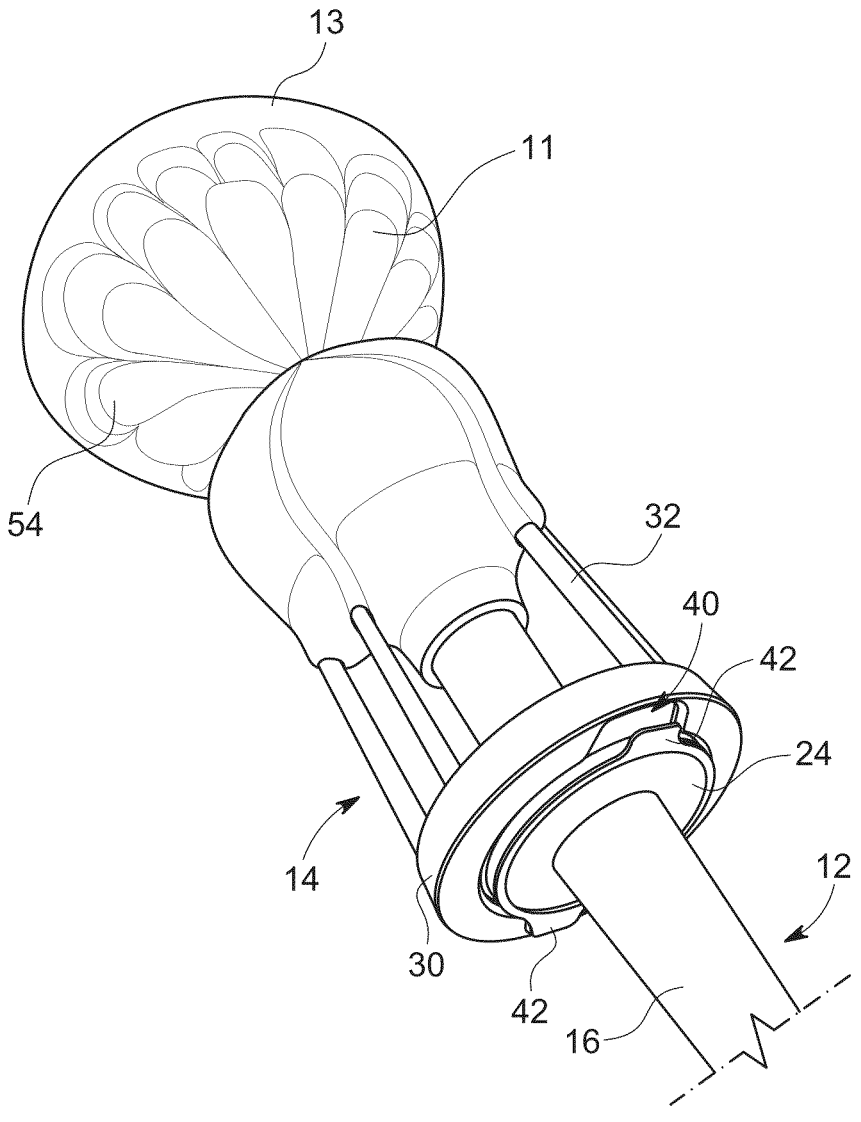
FIG. 9 shows a perspective view of the molten glass as it is being forced off the metal framework.
Figure 10:
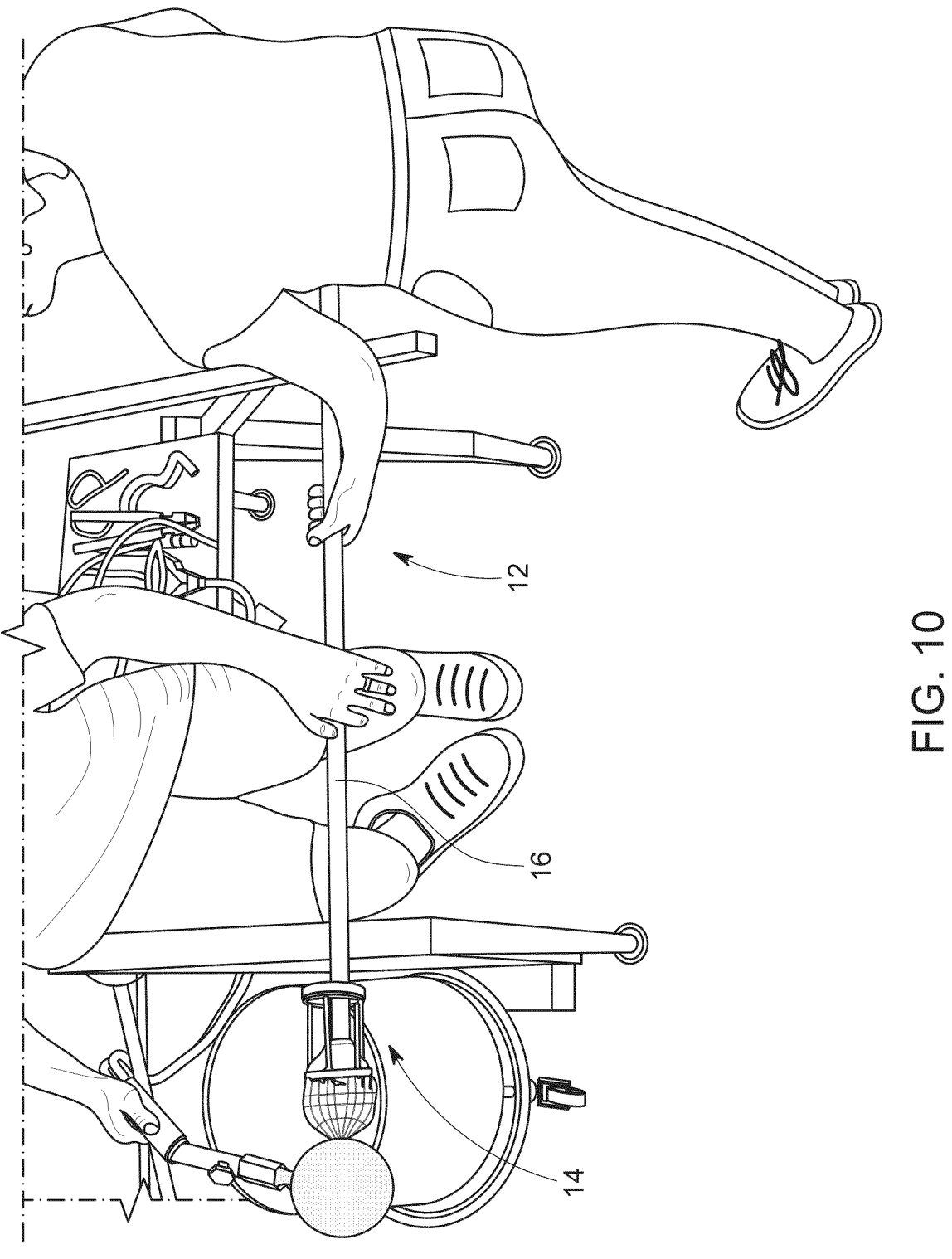
FIG. 10 shows a perspective view of two workers heating the molten glass shortly before it is removed from the metal framework.
Figure 11:
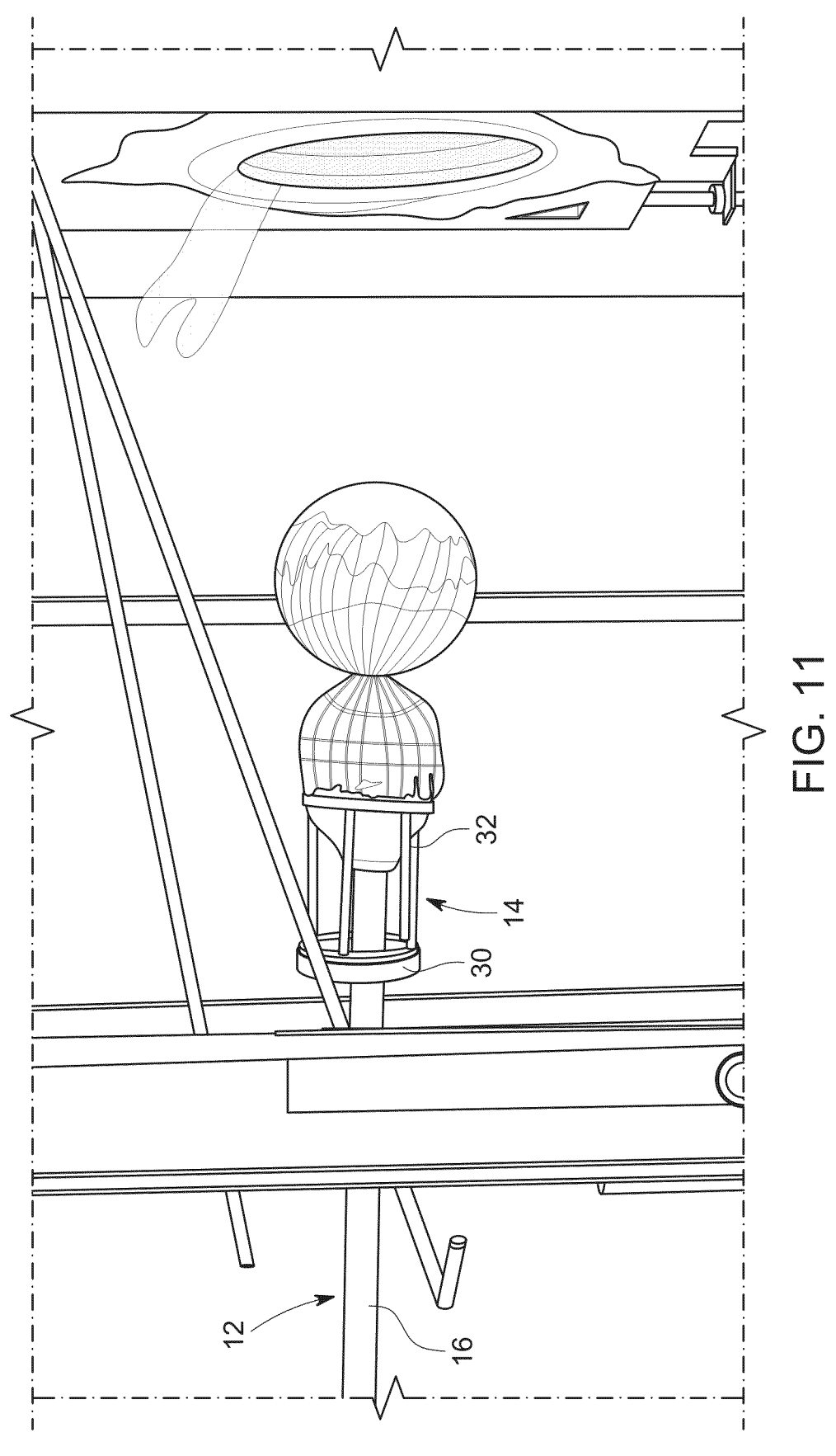
FIG. 11 shows a perspective view of the molten glass being heated with the glory hole shortly before it is removed from the metal framework.

FIGS. 9-11 show the molten glass 11, 13 in various stages of removal from the residual glass that remains on the metal framework 14. As shown in FIGS. 10 and 11, the process can include additional heating of the molten glass 11, 13 using a reheating furnace, torch, or glory hole.

Figure 12:
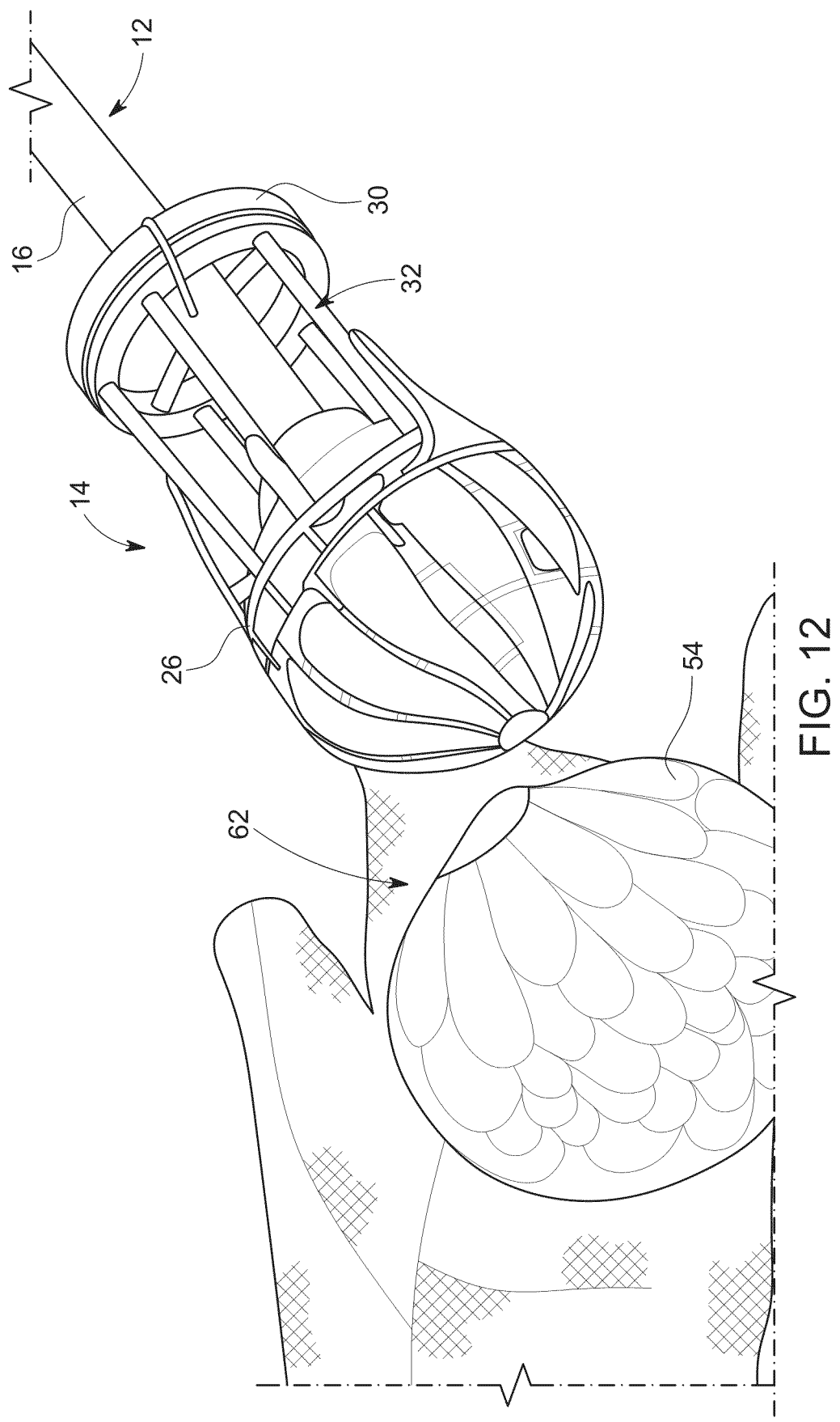
FIG. 12 shows a perspective view of the glass form shortly after it is removed from the metal framework.

Referring to FIG. 12, the molten glass 11, 13 is cooled sufficiently to form a glass form 62 that is snapped off the residual glass that is still on the metal framework 14. The glass form 62 has a rounded or globe-like shape. The residual glass can be melted and removed from the metal framework 14 so that the glass and/or metal framework 14 can be reused to make additional blown glass products.

The glass form 62 is heated to achieve an approximately uniform temperature profile throughout. The glass form 62 should be annealed properly to relieve internal stresses that may build up during the glass blowing process. A well-designed annealing cycle considers the specific characteristics of the glasses being used to bring them down to room temperature at a rate that minimizes stress. In one embodiment, the glass form 62 is placed in an annealer for a sufficient amount of time (e.g., 24-30 hrs or 28 hrs) to cool to room temperature without breaking or cracking.

Figure 14:
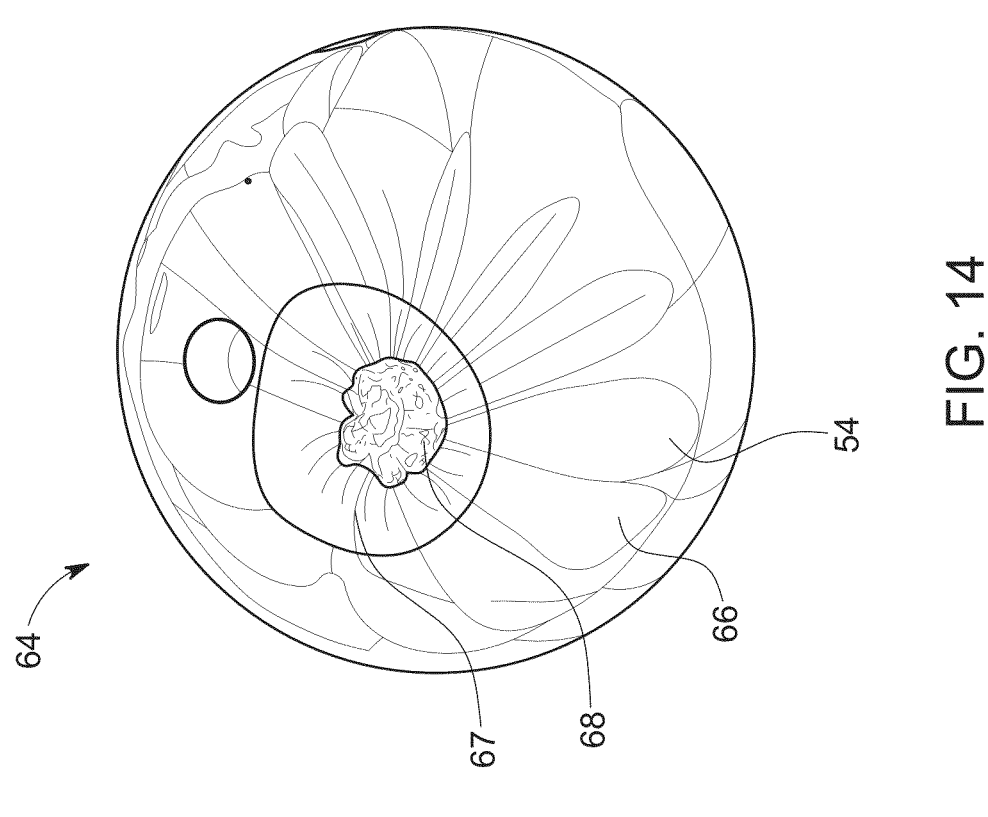
FIG. 14 shows a perspective view of one embodiment of a blown glass product having a hole formed in it to receive lighting hardware.
Figure 13:
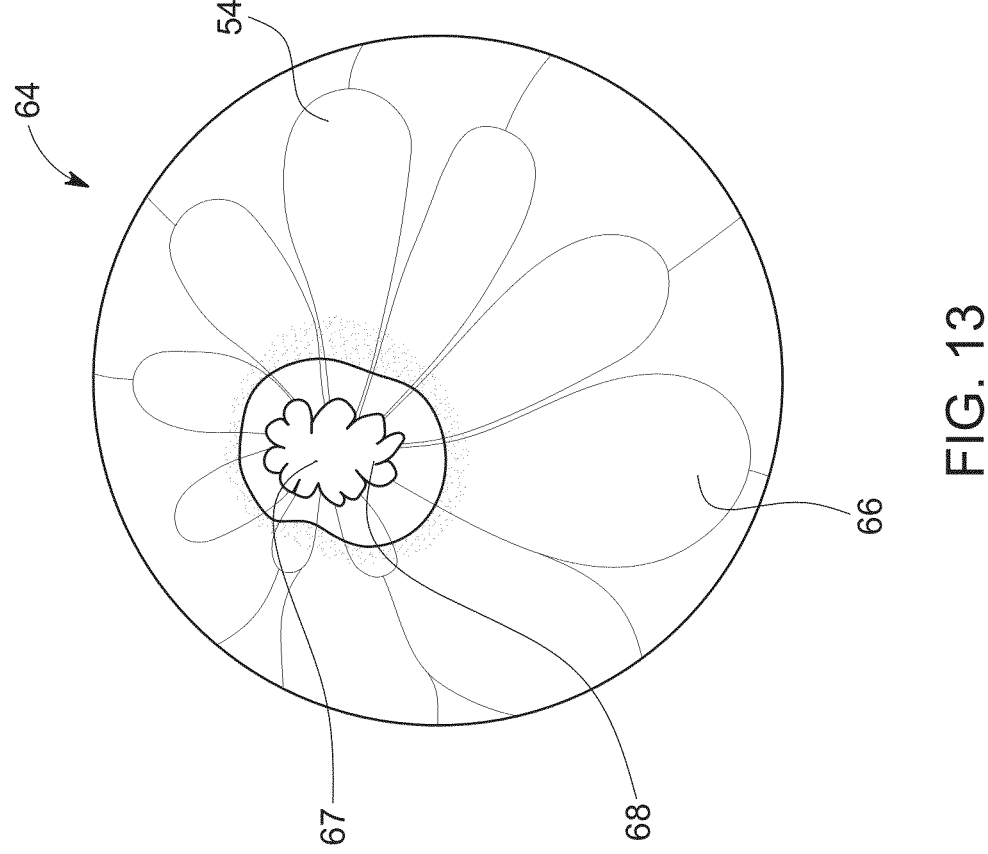
FIG. 13 is a perspective view of one embodiment of a blown glass product with a facet formed where the bubble chambers were closed at the surface of the blown glass product.

FIGS. 13 and 14 show perspective view of a blown glass product 64 that is made using the glass blowing apparatus 10 and/or the glass blowing method. The blown glass product 64 includes a number of bubble chambers 54 having an elongated shape. The bubble chambers have rounded ends 66 positioned opposite tapered ends 68. The tapered ends 68 at the area on one side of the blown glass product 64 where it was broken off the residual glass on the metal framework 14.

The bubble chambers 54, especially those visible on the surface of the blown glass product 64, can be characterized as having a feather-like shape. The feather-like shape, combined with the convergence of the tapered ends, creates a visually striking pattern, adding to the aesthetic allure of the blown glass product 64.

The area of convergence is positioned near the outer surface of the blown glass product 64. In some embodiments, a facet 67 is formed at the area where the glass form 62 was snapped off and the tapered ends of the bubble chambers 54 converge. the facet can be used to smooth any sharp edges and/or otherwise enhance the appearance of the blown glass product 64.

In some embodiments, the blown glass product 64 can include another facet 69 through which a hole 71 extends into the interior of the blown glass product. The hole 71 can be sized to receive, for example, lighting hardware such as a light bulb and the like. In this embodiment, the blown glass product 64 can be a light fixture.

Figure 15:
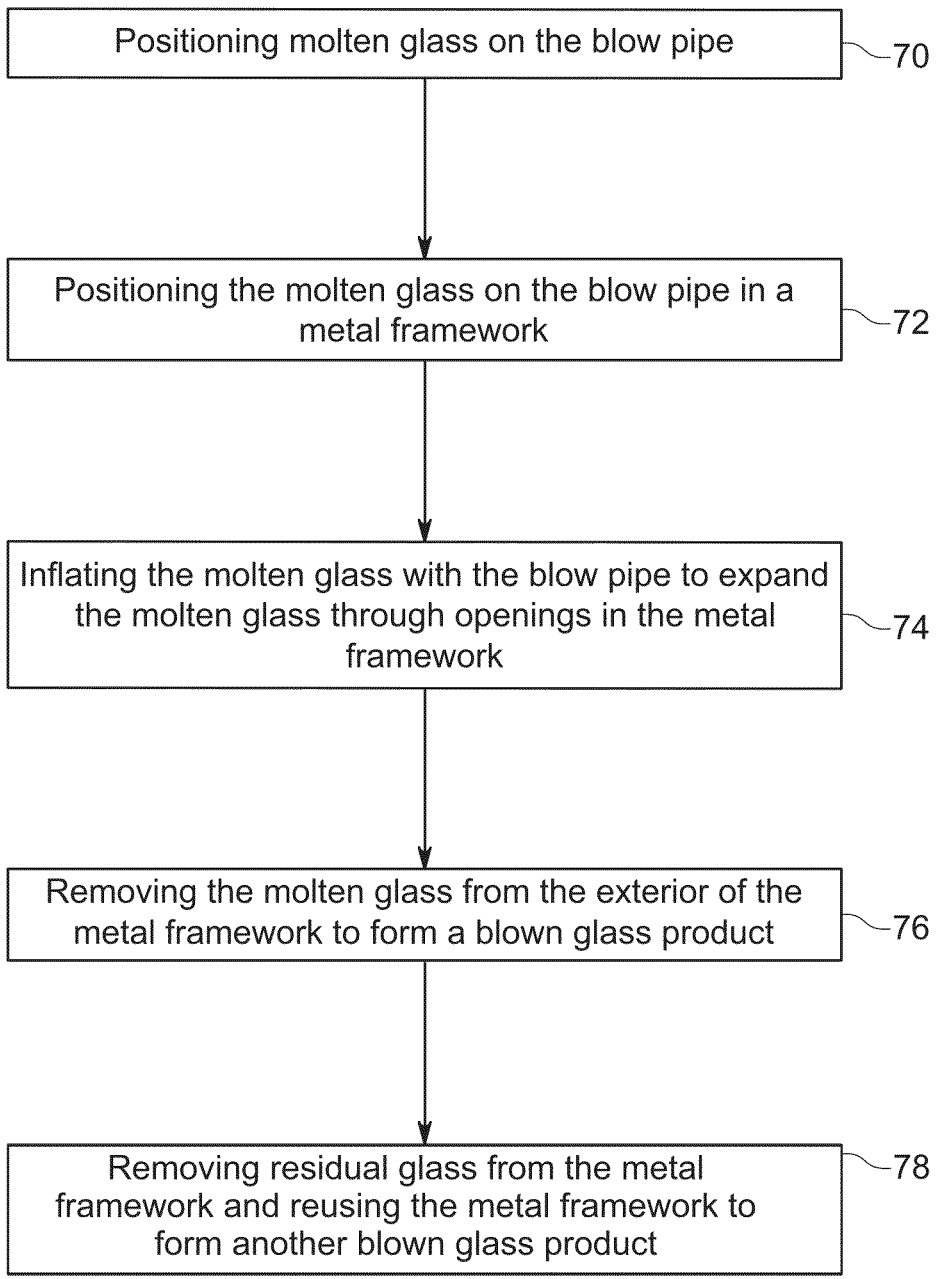
FIG. 15 is a flowchart of one embodiment of a glass blowing method.

FIG. 15 is a flowchart of one example of a glass blowing method. The method includes, at step 70, positioning molten glass 11 on the blow pipe 12. At step 72, the molten glass 11 on the blow pipe 12 is positioned in a metal framework 14. At step 74, the molten glass 11 is inflated with the blow pipe 12 to expand the molten glass 11 through openings 28 in the metal framework 14. At step 76, the molten glass 11 is removed from the exterior of the metal framework 14 to form a blown glass product 64.

At step 78, the metal framework 14 is released from the blow pipe 12. Water is used to remove the glass from the cage 26 (e.g., the water causes the glass to break and fall off the cage 26). The metal framework 14 can be used again to form additional blown glass products. There is conceivably no limit to the number of times the metal framework 14 can be used in the process.

Illustrative Embodiments

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A glass blowing method comprising: positioning molten glass on a blow pipe; positioning the molten glass on the blow pipe in a metal framework; inflating the molten glass with the blow pipe to expand the molten glass through openings in the metal framework; and removing the molten glass from the exterior of the metal framework to form a blown glass product.

P2. The glass blowing method of P1 wherein the molten glass is soda-lime glass.

P3. The glass blowing method of P1 wherein the molten glass is a first gather of molten glass, the method comprising positioning a second gather of molten glass on the first gather of molten glass that has expanded through the openings in the metal framework.

P4. The glass blowing method of P3 wherein the first gather is colored glass and the second gather is clear glass.

P5. The glass blowing method of P1 wherein removing the molten glass from the exterior of the metal framework comprises forcing the molten glass off the metal framework with a wooden trough.

P6. The glass blowing method of P1 wherein inflating and expanding the molten glass through the openings in the metal framework forms bubble chambers in the molten glass.

P7. The glass blowing method of P6 wherein removing the molten glass from the exterior of the metal framework comprises constricting the bubble chambers with one or more jacks.

P8. The glass blowing method of P1 comprising coupling the blow pipe to the metal framework.

P9. The glass blowing method of P1 comprising heating the molten glass removed from the exterior o the metal framework to achieve an at least approximately uniform temperature profile.

P10. The glass blowing method of P1 comprising annealing the molten glass to form the blown glass product.

P11. The glass blowing method of P10 comprising annealing the molten glass for at least 20 hours.

P12. The glass blowing method of P1 comprising drilling a hole in the blown glass product.

P13. The glass blowing method of P12 comprising positioning lighting hardware in the hole in the blown glass product.

P14. The glass blowing method of P1 comprising removing residual glass from the metal framework and repeating the process with another gather of molten glass.

P15. A blown glass product produced by the glass blowing method of P1.

P16. A glass blowing apparatus comprising: a blow pipe including a head and a mouthpiece end, the head being structured to receive and hold molten glass; and a metal framework structured to be coupled to the head of the blow pipe.

P17. The glass blowing apparatus of P16 wherein the molten glass is positioned on the head of the blow pipe and the blow pipe and the metal framework are coupled together.

P18. The glass blowing apparatus of P17 wherein the metal framework surrounds the molten glass.

P19. The glass blowing apparatus of P16 wherein the blow pipe has an elongated cylindrical shape that flares outward at the head.

P20. The glass blowing apparatus of P16 wherein the blow pipe comprises a main shaft having a cylindrical shape, wherein the head of the blow pipe is 1.25-5 times as large as the main shaft (or at least 1.25 times as large as the main shaft, at least 1.3 times as large as the main shaft, etc; or no more than 5 times as large as the main shaft, no more than 4.75 times as large as the main shaft, etc.).

P21. The glass blowing apparatus of P16 wherein the mouthpiece end includes a mouthpiece and/or the head is flared outward to receive and hold the molten glass.

P22. The glass blowing apparatus of P16 wherein the blow pipe is 2-10 ft long (or at least 2 ft long, at least 2.5 ft long, etc.; or no more than 10 ft long, no more than 9 ft long, etc.).

P23. The glass blowing apparatus of P16 wherein the blow pipe comprises a blow pipe coupler positioned near the head of the blow pipe, the blow pipe coupler being structured to be coupled to the metal framework.

P24. The glass blowing apparatus of P23 wherein the width of the blow pipe coupler is greater than the width of the head of the blow pipe.

P25. The glass blowing apparatus of P16 wherein the blow pipe is made of stainless steel.

P26. The glass blowing apparatus of P16 wherein the blow pipe has a melting point of at least 1300° C. (or at least 1400° C.).

P27. The glass blowing apparatus of P16 wherein the metal framework is structured to surround the molten glass on the head of the blow pipe.

P28. The glass blowing apparatus of P16 wherein the metal framework includes an opening sized to receive the head of the blow pipe.

P29. The glass blowing apparatus of P28 wherein the opening is 1.5-5 times a maximum size of the head of the blow pipe.

P30. The glass blowing apparatus of P16 wherein the metal framework includes a cage with openings, the cage being structured to surround the molten glass when the blow pipe is coupled to the metal framework.

P31. The glass blowing apparatus of P16 wherein the metal framework is made of stainless steel.

P32. The glass blowing apparatus of P16 wherein the metal framework has a melting point of at least 1300° C. (or at least 1400° C.).

P33. The glass blowing apparatus of P16 wherein the blow pipe and the metal framework are configured to be coupled together in a manner that prevents lengthwise movement of the blow pipe relative to the metal framework.

P34. The glass blowing apparatus of P16 wherein the blow pipe comprises a main shaft and a ring coupler positioned on the main shaft; wherein the metal framework comprises a collar sized to receive the head of the blow pipe; and wherein the collar and the ring coupler are structured to be coupled together in a manner that prevents lengthwise movement of the blow pipe relative to the metal framework.

P35. The glass blowing apparatus of P16 wherein the blow pipe comprises a blow pipe coupler positioned near the head; wherein the metal framework comprises an opening sized to receive the head of the blow pipe and a metal framework coupler; and wherein the blow pipe coupler and the metal framework coupler are configured to be coupled together to hold the blow pipe and the metal framework together.

P36. The glass blowing apparatus of P16 comprising a stand structured to support the metal framework above the ground.

P37. The glass blowing apparatus of P36 wherein the stand comprises support arms extending outward horizontally, wherein the support arms are spaced apart to receive and hold the metal framework.

P38. The glass blowing apparatus of P37 wherein the metal framework comprises a collar coupled to a cage with support struts, and wherein the stand is structured to receive the support struts between the support arms with the collar resting on top of the support arms.

P39. A blown glass product comprising: bubble chambers each of which has an elongated shape with a rounded end positioned opposite a tapered end; wherein the tapered ends of the bubble chambers converge at an area at one side of the blown glass product.

P40. The blown glass product of P39 wherein the bubble chambers have a feather-like shape.

P41. The blown glass product of P39 wherein the area where the tapered ends of the bubble chambers converge is positioned near an outer surface of the blown glass product.

P42. The blown glass product of P39 comprising a facet on an outer surface of the blown glass product at the area where the tapered ends of the bubble chambers converge.

P43. The blown glass product of P39 comprising a hole extending from an outer surface of the blown glass product into the interior of the blown glass product.

P44. The blown glass product of P43 comprising lighting hardware positioned in the hole.

P45. The blown glass product of P43 comprising a facet on the outer surface of the blown glass product through which the hole extends.

P46. The blown glass product of P43 wherein the hole extends through some but not all of the bubble chambers (i.e., the hole extends through no more than 75% of the bubble chambers, no more than 50% of the bubble chambers, or no more than 25% of the bubble chambers).

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate embodiments can also be implemented in combination in a single embodiment. Conversely, various features described in the context of a single embodiment can also be implemented in multiple embodiments separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of," "consisting of the recited subject matter plus impurities and/or trace amounts of other materials," or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and/or by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

Unless explicitly stated otherwise or otherwise apparent from context, terms such as "processing," "computing," "calculating," "determining," "displaying," or the like, refer to the action and processes of an electronic computing device including a processor and memory.

The subject matter recited in the claims is not coextensive with and should not be interpreted as coextensive with any embodiment, feature, or combination of features described or illustrated in this document. This is true even if only a single embodiment of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Quickly releasable joining (i.e., quick-release) refers to joining that that can be released without the use of tools. Readily or easily releasable joining refers to joining that can be readily, easily, and/or promptly released with little or no difficulty or effort. Some joining can qualify as both quickly releasable joining and readily or easily releasable joining. Other joining can qualify as one of these types of joining but not the other. For example, one type of joining may be readily or easily releasable but also require the use of a tool.

Non-quickly releasable joining (i.e., non-quick-release) refers to joining that can only be released with the use of tools. Difficult or hard to release joining refers to joining that is difficult, hard, or arduous to release and/or requires substantial effort to release. Some joining can qualify as both non-quickly releasable joining and difficult or hard to release joining. Other joining can qualify as one of these types of joining but not the other. For example, one type of joining may require the use of a tool but may not be difficult or hard to release.

The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners is given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or confirmat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, or the like can be permanent, readily releasable, or difficult to release depending on the application.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," or the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

Composition Related Terminology and Interpretative Conventions

Values expressed as a percentage, parts of, or a ratio are by weight unless expressly stated otherwise.

The description of a group or class of materials as suitable or preferred for a given purpose shall be understood as disclosing that a single member of the group or class or a mixture of any two or more members of the group or class are equally suitable or preferred.

The description of constituents in chemical terms refers to the constituents: (a) at the time of addition to any combination specified in the description and/or (b) generated in situ by chemical reactions with other constituents. The description of the constituents does not preclude other chemical interactions among the constituents of a mixture once mixed unless expressly stated otherwise.

The description of materials in ionic form additionally implies the presence of sufficient counter ions to produce electrical neutrality for the composition.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

U.S. Des. application Ser. No. 29/888,307, titled "Lighting Globe," filed on 29 Mar. 2023.

What is claimed is:

1. A glass blowing method comprising:
positioning molten glass on a blow pipe;
positioning the molten glass on the blow pipe in an interior of a metal framework;
inflating the molten glass with the blow pipe to expand the molten glass through openings in the metal framework to an exterior of the metal framework;
and removing the molten glass that has passed through the exterior of the metal framework to form a blown glass product.

2. The glass blowing method of claim 1 wherein the molten glass is a first gather of molten glass, the method comprising positioning a second gather of molten glass on the exterior of the metal framework and/or on the first gather of molten glass that has expanded through the openings in the metal framework.

3. The glass blowing method of claim 1 wherein inflating and expanding the molten glass through the openings in the metal framework forms bubble chambers in the molten glass.

4. The glass blowing method of claim 3 wherein removing the molten glass from the exterior of the metal framework comprises closing the bubble chambers.

5. The glass blowing method of claim 1 wherein the molten glass is soda-lime glass.

6. The glass blowing method of claim 1 comprising heating the molten glass removed from the exterior of the metal framework to achieve at least an approximately uniform temperature profile.

7. The glass blowing method of claim 1 comprising annealing the molten glass for at least 20 hours to form the blown glass product.

8. The glass blowing method of claim 1 comprising drilling a hole in the blown glass product.

9. The glass blowing method of claim 8 comprising positioning lighting hardware in the hole in the blown glass product.

10. The glass blowing method of claim 1 comprising removing residual glass from the metal framework and repeating the glass blowing method with another gather of molten glass.

11. A glass blowing method comprising:
positioning molten glass on a blow pipe:
coupling the blow pipe to a metal framework, the molten glass being positioned in an interior of a metal framework;
inflating the molten glass with the blow pipe to expand the molten glass through openings in the metal framework to an exterior of the metal framework; and
removing the molten glass that has passed through the exterior of the metal framework to form a blown glass product.

12. The glass blowing method of claim 11 wherein inflating and expanding the molten glass through the openings in the metal framework forms bubble chambers in the molten glass.

13. The glass blowing method of claim 12 wherein removing the molten glass from the exterior of the metal framework comprises closing the bubble chambers.

14. The glass blowing method of claim 11 comprising removing residual glass from the metal framework and repeating the glass blowing method with another gather of molten glass.

15. The glass blowing method of claim 11 comprising positioning lighting hardware in the blown glass product.

16. A glass blowing method comprising:
positioning a first gather of molten glass on a blow pipe;
positioning the first gather of molten glass on the blow pipe in an interior of a metal framework;
inflating the first gather of molten glass with blow pipe to expand the first gather of molten glass through openings in the metal framework;
positioning a second gather of molten glass on the first gather of molten glass that has passed through an exterior of the metal framework, the first gather of molten glass and the second gather of molten glass forming an amalgamation of molten glass on the exterior of the metal framework; and
removing the amalgamation of molten glass from the exterior of the metal framework to form a blown glass product.

17. The glass blowing method of claim 16 wherein the first gather of molten glass is colored glass and the second gather of molten glass is clear glass.

18. The glass blowing method of claim 16 wherein inflating and expanding the first gather of molten glass through the openings in the metal framework forms bubble chambers in the first gather of molten glass.

19. The glass blowing method of claim 18 wherein removing the amalgamation of molten glass from the exterior of the metal framework comprises closing the bubble chambers.

20. The glass blowing method of claim 16 comprising positioning lighting hardware in the blown glass product.

* * * * *